(12) United States Patent
Tagliabue et al.

(10) Patent No.: US 12,539,494 B2
(45) Date of Patent: Feb. 3, 2026

(54) PROCESS FOR THE CONCENTRATION OF AMINE WATER

(71) Applicant: ENI S.P.A., Rome (IT)

(72) Inventors: Marco Tagliabue, San Donato Milanese (IT); Claudia Cattaneo, Recco (IT); Antonio Comite, Genoa (IT)

(73) Assignee: ENI S.P.A., Rome (IT)

( * ) Notice: Subject to any disclaimer, the term of this patent is extended or adjusted under 35 U.S.C. 154(b) by 707 days.

(21) Appl. No.: 17/617,395

(22) PCT Filed: Jun. 17, 2020

(86) PCT No.: PCT/IB2020/055655
§ 371 (c)(1),
(2) Date: Dec. 8, 2021

(87) PCT Pub. No.: WO2020/254986
PCT Pub. Date: Dec. 24, 2020

(65) Prior Publication Data
US 2022/0242756 A1    Aug. 4, 2022

(30) Foreign Application Priority Data
Jun. 17, 2019 (IT) .......................... 102019000009207

(51) Int. Cl.
B01D 61/36   (2006.01)
C02F 1/44    (2023.01)
C02F 101/10  (2006.01)
C02F 101/38  (2006.01)

(52) U.S. Cl.
CPC ............ *B01D 61/364* (2013.01); *C02F 1/447* (2013.01); *B01D 2311/10* (2013.01); *B01D 2311/14* (2013.01); *C02F 2101/101* (2013.01); *C02F 2101/38* (2013.01)

(58) Field of Classification Search
None
See application file for complete search history.

(56) References Cited

U.S. PATENT DOCUMENTS

| 3,750,735 A | 8/1973 | Chiang et al. |
| 4,311,594 A | 1/1982 | Perry |
| 5,051,188 A | 9/1991 | Spiske et al. |

(Continued)

FOREIGN PATENT DOCUMENTS

| EP | 0918049 A1 | 5/1999 | |
| EP | 2708276 A1 * | 3/2014 | ......... B01D 53/1425 |
| WO | 2014/042530 A1 | 3/2014 | |

OTHER PUBLICATIONS

Lucy Mar Camacho et al ,"Advances in Membrane Distillation for Water Desalination and Purification Applications" Water 2013, 5, 94-196; doi:10.3390/w5010094 (Year: 2013).*

(Continued)

*Primary Examiner* — Magali P Slawski
*Assistant Examiner* — Marriah CG Ellington
(74) *Attorney, Agent, or Firm* — Ruggiero McAllister & McMahon LLC

(57) ABSTRACT

A process for concentrating amine water is achieved by dehydrating the amine water by membrane distillation at a temperature ranging from 30° C. to 95° C. and at a pressure ranging from 1.0 bar to 1.5 absolute bar.

22 Claims, 2 Drawing Sheets

(56) References Cited

U.S. PATENT DOCUMENTS

| | | | |
|---|---|---|---|
| 5,171,449 | A | 12/1992 | Pasternak et al. |
| 5,202,023 | A * | 4/1993 | Trimmer ................ B01D 53/22 210/321.89 |
| 5,334,314 | A | 8/1994 | Neel et al. |
| 6,716,355 | B1 * | 4/2004 | Hanemaaijer ........ B01D 63/043 203/25 |
| 7,837,877 | B2 | 11/2010 | Cao et al. |
| 7,985,331 | B2 * | 7/2011 | Baudot ................ B01D 61/246 585/818 |
| 9,028,654 | B2 | 5/2015 | Ungerer et al. |
| 9,039,900 | B2 | 5/2015 | Mitra et al. |
| 2010/0112728 | A1 * | 5/2010 | Korzenski ......... H01L 21/02079 257/E21.294 |
| 2011/0127218 | A1 * | 6/2011 | Reddy ................ B01D 19/0015 210/640 |
| 2011/0180479 | A1 | 7/2011 | Cardatos et al. |
| 2011/0209391 | A1 | 9/2011 | Miglio et al. |
| 2018/0029910 | A1 * | 2/2018 | Prakash ............... B01D 61/145 |
| 2018/0043296 | A1 * | 2/2018 | Temple .............. B01D 53/1487 |

OTHER PUBLICATIONS

Global Colloquium on GeoSciences and Engineering 2017 IOP Publishing; IOP Conf. Series: Earth and Environmental Science 118 (2018) 012019 doi:10.1088/1755-1315/118/1/012019 (Year: 2017).*

BolhÃ r-Nordenkampf et al "Modelling selective H2S absorption and desorption in an aqueous MDEA-solution using a rate-based non-equilibrium approach" Chemical Engineering and Processing 43 (2004) 701â715 (Year: 2004).*

Lehr, L., A.D. Allen, and R. Lease, 1982, "Potential for By-Product Recovery in Geothermal Energy Operations", Energy and Economics Research Inc, Vienna, VA, prepared for Geothermal and Hydropower Division, U.S. Department of Energy (Year: 1982).*

Zho et al; "Membrane evaporation of amine solution for energy saving in post-combustion carbon capture: Performance evaluation"; Journal of Membrane Science, vol. 473, Jan. 1, 2015; pp. 274-282.

Kiss et al; "An industrial perspective on membrane distillation processes: Membrane distillation processes"; Journal of Chemical Technology and Biotechnology, vol. 93, No. 8; May 16, 2018; pp. 2047-2055.

International Search Report dated Oct. 16, 2020 for PCT Appl. No. PCT/IB2020/055655.

Written Opinion dated Oct. 16, 2020 for PCT Appl. No. PCT/IB2020/055655.

International Report on Patentability (IPRP) dated Sep. 6, 2021 for PCT Appl. No. PCT/IB2020/055655.

ARIPO Office Action dated Jul. 4, 2023 from corresponding ARIPO Patent Application No. AP/P/2021/013696, 4 pages.

Chinese First Office Action dated Feb. 27, 2023 from corresponding Chinese Patent Application No. 202080044669.4, 19 pages.

Zhao et al.; "Membrane evaporation of amine solution for energy saving in post-combustion carbon capture: Performance evaluation", Journal of Membrane Science, No. 1, vol. 473, pp. 274-282.

Eide-Augmo et al., Environmental Impact of Amines, Energy Procedia 1 (2009) 1297-1304.

E. Corsini et al., Perfluorinated Compounds Emerging Persistent Organic Pollutants with Potential Immunotoxicity, Toxicology Letters 230 (2) 2014 263-270).

L.F. Greenlee et al., Reverse Osmosis Desalination: Water Sources, Technology, and Today's Challenges, Water Research 43 (2009) 2317-2348).

S.S. Madaeni, The Application of Membrane Technology for Water Disinfection, Water Research 33 (2) (1999) 301-308.

C.V. Simmons, Reclaiming Used Amine and Glycol Solutions, Mar. 4-Mar. 6, 1991, Norman, Oklahoma.

R. Wagner, Gas Sweetening Fundamentals, Laurance Reid Gas Conditioning Conference, Feb. 26-Mar. 1, 2006, Norman, Oklahoma.

Q. Wang et al., Desalination by Pervaporation: a Review, Desalination 387 (2016) 46-60).

* cited by examiner

PROCESS FOR THE CONCENTRATION OF AMINE WATER

CROSS-REFERENCE TO RELATED APPLICATIONS

This Patent Application is a national stage application, filed under 35 U.S.C. § 371 of International Patent Application No. PCT/IB2020/055655, filed on Jun. 17, 2020, that claims priority from Italian Patent Application No. 102019000009207 filed on Jun. 17, 2019, the entire disclosure of each of which is incorporated herein by reference.

BACKGROUND OF THE DISCLOSURE

1. Field of the Disclosure

The present disclosure is part of the treatment of wastewater produced by natural gas treatment plants and in particular produced by natural gas washing plants.

The present disclosure relates to a process for concentrating wastewater deriving from the partial or total replacement of aqueous solutions of chemical compounds containing nitrogen used for the treatment of natural gas which in this text are also indicated with the term "amine water".

In the present patent application, all the operating conditions reported in the text must be understood as preferred conditions even if not expressly declared.

For the purposes of the present discussion the term "to comprise" or "to include" also comprises the term "to consist in" or "essentially consisting of".

For the purposes of the present discussion the definitions of the ranges always comprise the extreme values unless otherwise specified.

For the purposes of the present patent application polymer refers to a macromolecule consisting of several groups of atoms, "repetitive units", the same or different (in the copolymers), joined in a chain by repeating the same type of bond.

2. Description of the Related Art

The reduction of the hydrogen sulfide content in the raw natural gas is usually carried out by washing with aqueous solutions of tertiary alkanolamines (typically MDEA, N-methyldiethanolamine), inducing the formation of the respective salts. The latter are subsequently thermally decomposed allowing the recycling of the washing solutions and at the same time the release of gaseous hydrogen sulfide. The partial or total periodic replacement of aqueous solutions of tertiary alkanolamines is necessary due to their progressive deterioration following the washing and regeneration cycles (R. Wagner, Gas Sweetening Fundamentals, Laurance Reid Gas Conditiong Conference, 26 Feb.-1 Mar. 2006, Norman, Oklahoma). The wastewater obtained, "amine water", has a pH greater than 9.0 and high contents of organic and inorganic chemical compounds.

Amine water is usually sent to pyrolysis or disposal (C. V. Simmons, Reclaiming Used Amine and Glycol Solutions, 4 Mar.-6 Mar. 1991, Norman, Oklahoma). This entails high costs especially if it is necessary the transportation thereof, for example, by tankers.

The sending of amine water to a biodegradation process is not possible due to its high toxicity (I. Eide Augmo et al., Environmental Impact of Amines, Energy Procedia 1 (2009) 1297-1304).

One way to reduce transportation and disposal costs is to concentrate amine water.

Traditionally, the concentration by distillation of amine water requires operating conditions such as high temperatures, the vacuum and the use of equipment made of special materials capable of withstanding its chemical aggressiveness.

EP 0918049 describes a process for purifying aqueous solutions containing alkanolamines by distillation carried out in film evaporators. The process takes place in two stages: dehydration is carried out in the first stage while purification is performed in the second stage.

The treated solutions contain from 10% to 90% weight of water, up to 20% weight of contaminants and degradation products, the remaining part being alkanolamines and possibly a cosolvent. In the first stage it is operated at temperatures in the range 130-180° C. and pressures in the range 0.4-0.9 bar.

In the second stage it is operated at temperatures in the range 120-200° C. and pressures in the range 0.02-0.1 bar. The concentration of amine water by nanofiltration (NF) or reverse osmosis (RO) requires the application of high hydraulic pressures, typically in the range 5-150 bar and is subject to phenomena of irreversible fouling of the membranes (fouling, scaling). For this reason, said systems are proposed downstream of pretreatment processes (S. S. Madaeni, The Application of Membrane Technology for Water Disinfection, Water Research 33 (2) (1999) 301-308; L. F. Greenlee et al., Reverse Osmosis Desalination: Water Sources, Technology, and Today's Challenges, Water Research 43 (2009) 2317-2348).

U.S. Pat. No. 9,028,654 describes a process and a system for the treatment of a wastewater containing amines or the derivatives thereof and water. The process provides for the wastewater to be subjected to evaporation, by means of at least two heat exchangers and one RO. From this process, water with a purity greater than 95% by weight based on the weight of the distillate obtained after evaporation is obtained.

The application of systems based on membrane distillation (MD) and pervaporation (PV) have been proposed for the concentration of wastewater with a complexity comparable to that of amine water. Both provide for the heating of the feed in liquid phase, the permeation of the distillate in vapour phase through a membrane (in both systems it is not necessary to reach the boiling temperature of the feed) and the condensation of the latter to give a distillate in liquid phase with a composition other than that of the feed. The distillate is enriched by low boiling chemical compounds while the concentrate is enriched by high boiling chemical compounds. The flow of vapour from the feed sector to that of the distillate can be promoted by keeping the distillate sector under vacuum (vacuum membrane distillation, VMD), in carrier gas flow (sweep gas membrane distillation, SGMD) or by condensing the vapour at a sufficiently low temperature by heat exchange with a cold fluid (air gap membrane distillation, AGMD; direct contact membrane distillation DCMD). The fundamental difference between MD and PV is in the role played by the membrane in the separation. MD is based on porous hydrophobic membranes which only act as a support for the liquid-vapour interface. The presence of surfactants (for example amines and the salts thereof) in the feed reduces the effectiveness of the MD by promoting the passage of the feed in liquid phase as such in the distillate sector (L. M. Camacho et al., Advances in Membrane Distillation for Water Desalination and Purification Applications, Water 5 (2013) 94-196). PV is based on dense membranes with high chemical selectivity towards some feed components (Q. Wang et al., Desalination by Pervaporation: a Review, Desalination 387 (2016) 46-60).

U.S. Pat. No. 9,039,900 describes an MD based on polymeric membranes containing carbon nanotubes. Carbon nanotubes improve permeability, selectivity and mass transport. The examples describe the dehydration of mixtures containing active ingredients of drugs (ibuprofen, acetaminophenol, diphenhydramine, dibucaine) that are solid or high boiling in water obtaining enrichments greater than 94% operating at temperatures in the range 80-90° C. and applying the vacuum in the distillate sector.

US 2011/0180479 describes a process for treating waters which comprises a first separation stage to form a concentrate containing less than 7% by weight of dissolved solid and a second MD stage based on a system containing a bundle of hollow fibers. By introducing an RO stage, it is possible to reduce wastewater to "zero discharge". The treatment also allows to recover water with a quality suitable for reuse or discharge into the environment.

U.S. Pat. No. 7,837,877 describes a membrane system for the separation of fluid mixtures. The membrane is used in the form of a porous septum and interposed between the two compartments of a module between which a pressure difference is maintained. The system allows the separation of the initial mixture in a permeate in liquid phase and a distillate in gas phase, each of which has a composition different from the other one and from the feed. The examples describe the separation of mixtures of water, carbon dioxide, hydrogen, C3-hydrocarbons, C3– alcohols. The effectiveness in the treatment of amine water is not exemplified.

U.S. Pat. No. 5,171,449 describes a process for treating amine water by PV. The process is based on composite membranes made up of a dense polyvinyl alcohol layer deposited on a porous alumina support. The porous alumina support is necessary to ensure the resistance to the chemical aggression of the amine. The examples describe the dehydration of mixtures 74-78% by weight of amine, the remaining part being water, operating at a temperature of 70° C. and applying the vacuum in the distillate sector. Selectivity of the water in the distillate of 57-60% and distillate flow of 3.1-1.6 kg/(m$^2$*h) are obtained. The membrane is stable for 22 days.

U.S. Pat. No. 5,334,314 describes a process for dehydrating aqueous solutions containing amines by PV, in which the solution is put in contact with a membrane, on a first side, keeping the chemical potential of the water on the opposite side that is lower than that on the first side. The membrane used has a cross-linked polyvinyl alcohol layer characterized in that said layer has undergone treatment with acids.

The dehydration of a mixture containing 70% by weight of ethylamine is exemplified, the remaining part being water, operating at a temperature of 85° C. a distillate flow of 0.750 kg/m$^2$*h is obtained. The examples describe the dehydration of a mixture containing 40% by weight of pyridine, 60% by weight of water operating at 95° C.; then they describe the dehydration of a mixture containing 70% by weight of dimethylamine, the remaining part being water, operating at 100° C.; the membrane stability at temperatures close to 100° C. and high amine concentrations. In all the examples cited, it is presumed that the vacuum is applied in the distillate sector.

U.S. Pat. No. 5,051,188 describes a process for treating amine water by PV, for example using a water-selective membrane. The patent describes the use of membranes which have an active layer based on polyvinyl alcohol or the derivatives thereof.

The patent describes in particular the dehydration of a mixture containing 45% by weight of methylamine (as such or as carbamate), 28% by weight of carbon dioxide, the remaining part being water. It is operated at a temperature of 80° C. applying the vacuum in the distillate sector and obtaining a distillate flow of 0.500 kg/m$^2$*h.

U.S. Pat. No. 4,311,594 describes a process for treating waters containing neutral organic compounds C4+ by means of PV. Non-porous hydrophobic polymeric membranes are used. The latter may consist of polyolefins and their copolymers, polyolefins containing fluorine and their copolymers, polysiloxanes, or polyurethanes. It is operated at temperatures in the range 20 C-70° C., applying the vacuum in the distillate sector.

U.S. Pat. No. 3,750,735 describes a process for treating waters containing formaldehyde using organic polymeric membranes characterized by the presence of anionic groups derived from strong acids, for example polymers of acrylonitrile and styrene sulfonate whose porosity is not specified. It is operated at temperatures in the range 25° C.-70° C., applying the vacuum in the distillate sector.

Amine water is toxic and caustic. It is traditionally sent for pyrolysis or disposal. This entails high costs especially if the transportation thereof is necessary.

One of the ways to reduce the transportation and disposal costs of amine water is to concentrate it by dehydration.

BRIEF SUMMARY OF THE DISCLOSURE

Therefore, the subject of the present patent application is a process for concentrating the amine water by dehydrating it through membrane distillation (MD) conducted by maintaining the pressure between 1 and 1.5 absolute bar, definable as atmospheric pressure, and the temperature in the range 30-95° C., preferably 40-90° C., more preferably at 70° C.

The amine water treated according to the described and claimed process can preferably be an amine water which comprises water and chemical compounds containing nitrogen, characterized in that the concentration of total nitrogen varies in the range of between 10000 mg/L and 100000 mg/L. Said amine water can preferably further comprise sulfur sulfide whose concentration of sulfur sulfide ranges from 1000 mg/L to 10000 mg/L. Said amine water can preferably have a chemical oxygen demand which ranges from 100000 mg/L to 1000000 mg/L. Said amine water can preferably have an electrical conductivity that ranges from 500 µS/cm to 150000 µS/cm. Said amine water, moreover, can preferably have a boron content with a concentration which ranges from 10 mg/L to 1000 mg/L.

Advantageously, the process described and claimed allows to operate under milder conditions than those described in the prior art (lower temperatures, pressure 1-1.5 absolute bar instead of vacuum) through MD. The systems involved do not require special materials capable of withstanding the chemical aggressiveness of the amine water.

In this way it is possible to reduce the quantity of wastewater to be sent for pyrolysis or disposal and to recover water with a quality suitable for reuse or discharge into the environment.

The teachings traceable in the state of the art underline the critical issues related to the presence in the feed of chemical compounds capable of acting as surfactants.

The latter are capable of modifying the surface properties of the membranes used in MD, in particular of reducing their hydrophobicity, an essential prerequisite to ensure the passage of the distillate in vapour phase (enriched by water) but not of the feed in liquid phase through the membranes themselves (L. M. Camacho et al., Advances in Membrane Distillation for Water Desalination and Purification Applications, Water 5 (2013) 94-196).

Advantageously, the obtainable distillate has chemical-physical characteristics which indicate contamination at least 99% lower than the feed, for example, electrical conductivity, the chemical oxygen demand, the respective contents of different heteroelements.

BRIEF DESCRIPTION OF THE DRAWINGS

Further aims and advantages of the present disclosure will appear more clearly from the following description and from the accompanying figures, given purely by way of a non-limiting example, which represent preferred embodiments of the present disclosure.

Figure 1:
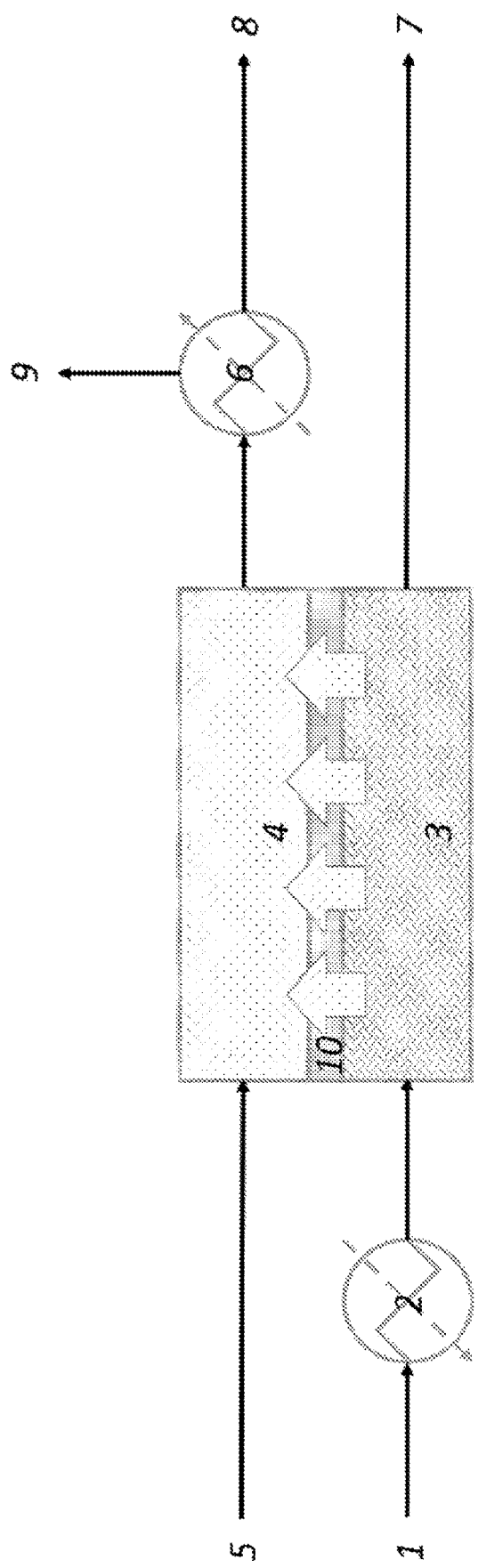
FIG. 1 schematically illustrates a module for the concentration of amine water according to the process described and claimed in the present patent application.

In the Figure the feed (1), i.e. the amine water, is heated (2), for example in a heat exchanger, before being fed to the MD membrane distillation unit in a first sector at atmospheric pressure, for example between 1 and 1.5 absolute bar (3). From here the distillate in vapour phase permeates through a polymeric membrane (10), leaving the concentrate (7) in the first sector. On the opposite side with respect to the first atmospheric pressure sector there is a second atmospheric pressure sector (4) in which carrier gas (5) flows which drags the distillate in vapour phase becoming saturated. Said saturated gaseous stream of distillate in vapour phase is cooled (6), for example in a heat exchanger, forming a distillate in liquid phase (8) and a gaseous stream containing the carrier gas and any non-condensable (9).

Figure 2:
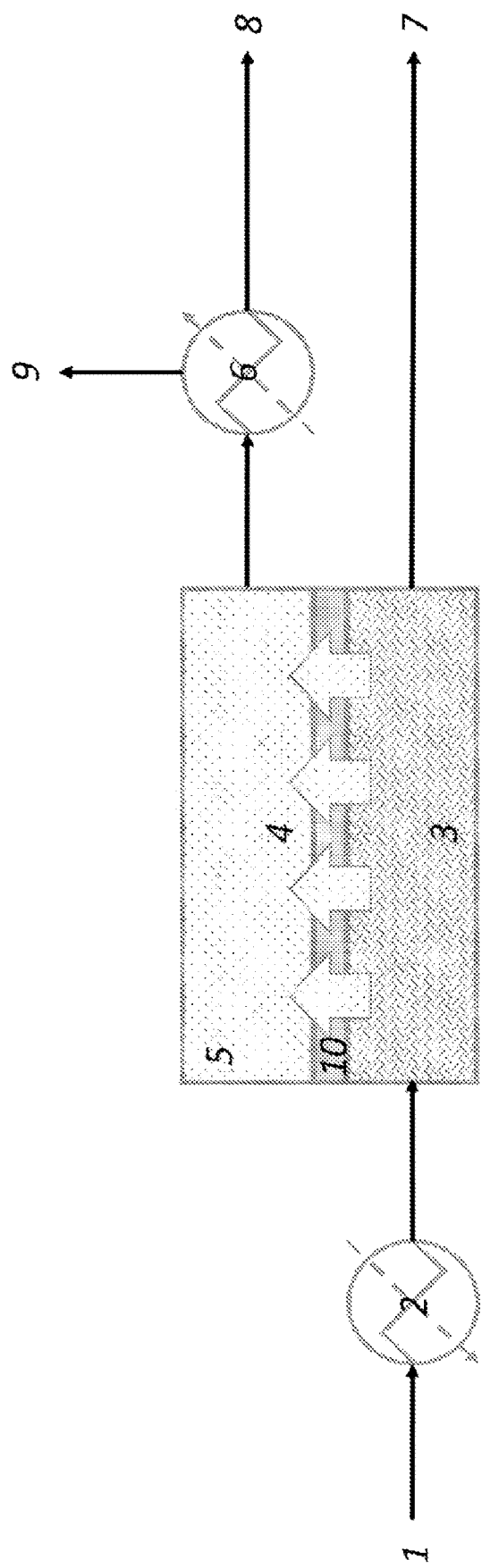

FIG. 2 is similar to FIG. 1 where however the carrier gas (5) is static.

DETAILED DESCRIPTION OF THE DISCLOSURE

The Applicant now describes in detail the process for concentrating amine water subject of the present patent application, also referring to FIG. 1.

The amine water is concentrated by dehydrating it through membrane distillation (MD) conducted by maintaining the pressure between 1 and 1.5 absolute bar, definable as atmospheric pressure, and the temperature in the range 30-95° C.

The amine water can preferably be an amine water which comprises water and chemical compounds containing nitrogen, characterized in that the concentration of total nitrogen varies in the range of between 10000 mg/L and 100000 mg/L. Preferably the concentration of total nitrogen in the amine water can vary in the range between 20000 mg/L and 100000 mg/L, more preferably in the range between 30000 mg/L and 100000 mg/L, still more preferably it is equal to 66000 mg/L. Preferably the process described and claimed in the present patent application allows to concentrate amine water in which the nitrogen-containing chemical compounds are the amines, more preferably an alkanolamine, still more preferably N-methyldiethanolamine.

The amine water (1) is heated to temperatures in the range from 30° C. to 95° C., preferably from 40° C. to 90° C., more preferably to 70° C.

For this purpose, heat exchangers external to the MD system or internal to the same system can be used, for example selected from coils, plates, or tube bundle exchangers.

Once heated, the amine water is fed to one or more MD units, each comprising one or more sectors maintained at a pressure that varies in the range 1-1.5 absolute bar, definable as atmospheric pressure (3), adjacent to a polymeric membrane (10), which in turn is adjacent to one or more sectors (4) maintained at a pressure that varies in the range 1-1.5 absolute bar (atmospheric pressure).

A carrier gas (5) can be fed to said MD unit in a dedicated sector maintained at a pressure which varies in the range 1-1.5 absolute bar (atmospheric pressure), distinct from that in which the amine water is fed.

The carrier gas can be fed at an initial temperature which preferably varies in the range of between 10° C. and 95° C.

The carrier gas can be selected from nitrogen, oxygen, carbon dioxide, methane, or mixtures thereof.

The polymeric membranes used for the purposes of the present patent application are hydrophobic and porous. The term "hydrophobic membrane" refers to membranes characterized by a contact angle with water greater than or equal to 70°, preferably in the range between 70° and 180°, more preferably in the range between 100° and 150°. The term "porous membranes" means membranes characterized by pores with a nominal diameter that varies in the range between 0.1 and 5.0 µm.

Said hydrophobic and porous polymeric membranes allow to obtain a vapour saturated carrier gas (distilled in vapour phase, enriched by water) and a concentrate (7). Amine water can preferably circulate with a linear speed in the range 0.3-3.0 m/s. The carrier gas can preferably circulate with a linear speed in the range 0.0-7.0 m/s, preferably between 0.1-7.0 m/s.

As previously said, an MD unit comprises one or more sectors maintained at a pressure which varies in the range 1-1.5 absolute bar (atmospheric pressure) adjacent to a polymeric membrane, said membrane being in turn adjacent to one or more sectors maintained at pressure varying in the range 1-1.5 absolute bar.

The sectors can be in the press filter type configuration, in the case of membranes in the form of sheets, or in the tube bundle type exchanger configuration, in the case of membranes in the form of hollow fibres.

The carrier gas saturated with vapour distillate is cooled by heat exchange (6) with a fluid which is at an initial temperature which varies in the range from 0° C. to 25° C. (9) so as to obtain a distillate in liquid phase (8).

For this purpose, heat exchangers external to the MD system or internal to the same system can be used, for example selected from coils, plates, or tube bundle exchangers.

The saturated gas of vapour distillate can also be cooled by direct contact with a fluid at an initial temperature which varies in the range 0-25° C. Said fluid can be selected from water, nitrogen, oxygen, carbon dioxide, pure or mixed methane.

The distillate in liquid phase, enriched by water, can be sent to subsequent treatments until reaching a quality suitable for reuse or discharge into the environment.

Said treatments can include a further membrane distillation operation.

Furthermore, the process described and claimed can comprise a stage in which the concentrate (7) (enriched by the high-boiling chemical compounds including methyldietylamine (MDEA) is sent to pyrolysis or disposal.

Furthermore, the gas enriched by non-condensable (9) can be sent to subsequent treatments until reaching a quality suitable for reuse or discharge into the environment.

The technical solution object of the present patent application allows the concentration by dehydration of the amine water under milder conditions than those described in the prior art, lower temperatures and atmospheric pressure instead of the vacuum, through MD.

Failure to use the vacuum unexpectedly allows to maximize its effectiveness.

In the present patent application, hydrophobic and porous membranes comprising inorganic or organic polymers and copolymers or combinations thereof, preferably organic polymers and copolymers or combinations thereof, more preferably organic polymers containing halogens and their copolymers, or combinations thereof, can be used; or organic polymers not containing halogens and their copolymers or combinations thereof can be used. still more preferably the hydrophobic and porous membranes can be organic polymers containing fluorine and their copolymers, or combinations thereof; or organic polymers not containing fluorine and their copolymers, or combinations thereof. still more preferably said membranes can be selected from oxides, sulfides, zeolites, metal-organic materials, such as for example metal-organic frameworks; carbonaceous materials, such as for example graphene; polysilanes and their copolymers; polysiloxanes and their copolymers; polysulfones and their copolymers; polyacrylates and their copolymers; polycarbonates and their copolymers; proteins, polyamides and their copolymers; polyurethanes and their copolymers; polyketones and their copolymers; polyesters and their copolymers; polysaccharides, polyethers and their copolymers; polyaromatics and their copolymers; polyolefins and their copolymers; or combinations thereof. Polyolefins containing fluorine, polyolefins not containing fluorine, polypropylene, polytetrafluoroethylene, polyvinylidene fluoride, or combinations thereof are preferred; among them the most preferred is polypropylene.

The chemical compounds listed above can be used in the preparation of the membranes as single chemical compounds or the combinations thereof, that is, as mixtures of the same or as successive layers of the same.

Polyolefins not containing fluorine are less expensive and less problematic from an environmental point of view (both during production and disposal) than those containing fluorine used in similar processes (E. Corsini et al., Perfluorinated Compounds Emerging Persistent Organic Pollutants with Potential Immunotoxicity, Toxicology Letters 230 (2) 2014 263-270).

The membranes used maintain their performance unaltered for at least 300 hours of service without being affected by the chemical aggressiveness of the amine water.

Preferably the process described and claimed in the present patent application allows to concentrate amine water which further comprises sulfur sulfide whose concentration varies in the range between 1000 mg/L and 10000 mg/L, preferably in the range between 2000 mg/L and 10000 mg/L, more preferably in the range between 3000 mg/L and 10000 mg/L, still more preferably equal to 3950 mg/L.

Preferably, the process described and claimed in the present patent application allows to concentrate amine water further characterized by a chemical oxygen demand which varies in the range between 100000 mg/L and 1000000 mg/L, more preferably between 200000 mg/L and 1000000 mg/L, still more preferably between 300000 mg/L and 1000000 mg/L, still more preferably equal to 711000 mg/L.

Preferably, the process described and claimed in the present patent application allows to concentrate amine water further characterized by an electrical conductivity which varies in the range between 500 µS/cm and 150000 µS/cm, more preferably that varies in the range between 5000 µS/cm and 150000 µS/cm, still more preferably between 10000 µS/cm and 150000 µS/cm, still more preferably it is 10180 µS/cm.

Preferably the process described and claimed in the present patent application allows to concentrate amine water which further comprises a boron concentration which varies in the range between 10 mg/L and 1000 mg/L, preferably in the range between 50 mg/L and 1000 mg/L, more preferably in the range between 100 mg/L and 1000 mg/L, more preferably equal to 358 mg/L.

In a preferred form, the process described and claimed in the present patent application allows to concentrate amine water comprising nitrogen-containing chemical compounds, characterized in that the concentration of total nitrogen can vary in the range between 10000 mg/L and 100000 mg/L, preferably between 20000 mg/L and 100000 mg/L, more preferably between 30000 mg/L and 100000 mg/L; further comprising sulfur sulfide whose concentration varies in the range between 1000 mg/L and 10000 mg/L, preferably in the range between 2000 mg/L and 10000 mg/L, more preferably in the range between 3000 mg/L and 10000 mg/L.

In a preferred form, the process described and claimed in the present patent application allows to concentrate amine water comprising nitrogen-containing chemical compounds, characterized in that the concentration of total nitrogen can vary in the range between 10000 mg/L and 100000 mg/L, preferably between 20000 mg/L and 100000 mg/L, more preferably between 30000 mg/L and 100000 mg/L; further comprising sulfur sulfide whose concentration varies in the range between 1000 mg/L and 10000 mg/L, preferably in the range between 2000 mg/L and 10000 mg/L, more preferably in the range between 3000 mg/L and 10000 mg/L; said amine water also having a chemical oxygen demand which varies in the range between 100000 mg/L and 1000000 mg/L, more preferably between 200000 mg/L and 1000000 mg/L, still more preferably between 300000 mg/L and 1000000.

In a preferred form, the process described and claimed in the present patent application allows to concentrate amine water comprising nitrogen-containing chemical compounds, characterized in that the concentration of total nitrogen can vary in the range between 10000 mg/L and 100000 mg/L, preferably between 20000 mg/L and 100000 mg/L, more preferably between 30000 mg/L and 100000 mg/L; further comprising sulfur sulfide whose concentration varies in the range between 1000 mg/L and 10000 mg/L, preferably in the range between 2000 mg/L and 10000 mg/L, more preferably in the range between 3000 mg/L and 10000 mg/L; said amine water also having a chemical oxygen demand that varies in the range between 100000 mg/L and 1000000 mg/L, more preferably between 200000 mg/L and 1000000 mg/L, still more preferably between 300000 mg/L and 1000000; said amine water also having electrical conductivity which varies in the range between 500 µS/cm and 150000 µS/cm, more preferably which varies in the range between 5000 µS/cm and 150000 µS/cm, still more preferably between 10000 µS/cm and 150000 µS/cm.

In a preferred form, the process described and claimed in the present patent application allows to concentrate amine water comprising nitrogen-containing chemical compounds, characterized in that the concentration of total nitrogen can vary in the range between 10000 mg/L and 100000 mg/L, preferably between 20000 mg/L and 100000 mg/L, more preferably between 30000 mg/L and 100000 mg/L; further comprising sulfur sulfide whose concentration varies in the range between 1000 mg/L and 10000 mg/L, preferably in the range between 2000 mg/L and 10000 mg/L, more preferably in the range between 3000 mg/L and 10000 mg/L; said amine water also characterized by a chemical oxygen demand which varies in the range between 100000 mg/L and 1000000 mg/L, more preferably between 200000 mg/L and 1000000 mg/L, still more preferably between 300000 mg/L and 1000000; said amine water also characterized by an electrical conductivity that varies in the range between 500 µS/cm and 150000 µS/cm, more preferably that varies in the range between 5000 µS/cm and 150000 µS/cm, still more preferably between 10000 µS/cm and 150000 µS/cm; said amine water which further comprises a boron concentration which varies in the range between 10 mg/L and 1000 mg/L, preferably in the range between 50 mg/L and 1000 mg/L, more preferably in the range between 100 mg/L and 1000 mg/L.

In all the preferred forms according to the present patent application, the nitrogen concentration, the sulfur sulfide, the chemical oxygen demand, the electrical conductivity and the boron concentration can vary in the preferred ranges previously listed.

The data shown in the examples show that the quality of the distillate in liquid phase obtainable through MD conducted by applying vacuum in the distillate sector is lower than that obtainable through MD conducted by maintaining the distillate sector at atmospheric pressure.

The MD conducted by maintaining the distillate sector at atmospheric pressure is therefore the most effective system for concentrating amine water.

Some application examples of the present disclosure are now described, which have a purely descriptive and non-limiting purpose and which represent preferred embodiments.

EXAMPLES

The MD tests were carried out by means of a system equipped with a tubular module made of AISI 316 L stainless steel with an internal diameter of 25 mm and a length of 300 mm. A beam of polypropylene capillary membranes AccurelS S6/2™ membrane, with an internal diameter of 1.8 mm, was housed inside the module; wall thickness of 0.45 mm; total area of 131 cm²; pore diameter of 0.2 µm; contact angle with water of 120° measured with a Biolin Scientific Attension T200™ angle meter.

It was operated by completely recycling the distillate and the concentrate to the 2 L feed tank. The latter was placed on a DLab MS-H280-Pro™ stirring-heating magnetic plate with integrated temperature probe to maintain the system temperature at the value defined for each test.

The feed was sent to the module by means of a Plastomec P051™ polypropylene magnetic drive pump in order to have a linear speed tangential to the external surface of the capillary membranes of 2.6 m/s. The system has been prepared so that the lumen of each capillary membrane can be maintained in the flow of carrier gas or alternatively under vacuum.

The distillate in vapour phase was condensed by means of a straight barrel liebig glass refrigerant maintained at 0° C. by means of a Lauda RC6™ thermo-cryostat with external circulation of the mixture of water and Petronas Paraflu-Blu™ 1/1 v./v. The distillate in liquid phase was collected in a glass flask connected to the refrigerant. Amine water containing MDEA having the following chemical-physical characteristics was used as a feed:

pH of 12.7 measured by the Eutech PH510™ instrument with Hanna HI1230™ probe;

electrical conductivity (EC) of 10180 µS/cm measured by the Hanna EC215™ instrument with Hanna H176303™ probe;

chemical oxygen demand (COD) of 711000 mg/L;

total nitrogen content (N) of 66000 mg/L;

sulfur sulfide content ($S^{2-}$) of 3950 mg/L;

boron content (B) of 358 mg/L.

The measurements of COD, N, S, B, respectively, were carried out with a test tube kit using the Merck Spectroquant Pharo 300™ ultraviolet-visible spectrophotometer equipped with the Merck Spectroquant TR320™ reactor.

Boron was introduced as boric acid (Sigma Aldrich ACS-Grade™, purity greater than 99.5% weight) as a tracer. Measurements of the distillate flow rate were carried out in liquid phase every 15 min from which it was possible to trace the flow and 50 mL samples of the same to measure its chemical-physical properties, in this text also generically indicated with the term "G".

The respective retentions "R" have been calculated from the chemical-physical characteristics of the feed and the distillate according to the equation:

$$R(G)\ \%=[(G)\ \text{Feed}-(G)\ \text{Distillate}]*100/(G)\ \text{Feed}.$$

Example 1: Test at 50° C. (Distillate Sector at Atmospheric Pressure)

The lumen of each capillary membrane was maintained in the carrier air flow (Air Liquide Alphagaz 1™, purity greater than 99.999%) in order to have a linear speed of 4 m/s. An average distillate flow of 0.75 L/m²*h was obtained. Table 1 shows the pH of the distillate and the retentions referring to the chemical-physical characteristics that indicate contamination after different service times ("N.D." if not determined). The data shown show the membrane stability for at least 300 h of service.

TABLE 1

| t [h] | pH [-] | R (EC) [%] | R (COD) [%] | R (N) [%] | R (S) [%] | R (B) [%] |
|---|---|---|---|---|---|---|
| 50 | 8.5 | 99.48 | 99.97 | 99.97 | N.D. | 99.98 |
| 150 | 8.7 | 99.45 | 99.96 | 99.97 | 99.88 | 99.97 |
| 300 | 9.4 | 99.55 | 99.95 | 99.96 | 99.95 | 99.98 |

Example 2: Test at 70° C. (Distillate Sector at Atmospheric Pressure)

The MD test described in Example 1 was repeated by operating at 70° C.

An average distillate flow of 2.20 L/m²*h was obtained. Table 2 shows the pH of the distillate and the retentions referring to the chemical-physical characteristics that indicate contamination after different service times. The data shown show the membrane stability for at least 300 h of service.

TABLE 2

| t [h] | pH [-] | R (EC) [%] | R (COD) [%] | R (N) [%] | R (S) [%] | R (B) [%] |
|---|---|---|---|---|---|---|
| 100 | 8.5 | 99.50 | 99.90 | 99.96 | 99.90 | 99.95 |
| 300 | 9.4 | 99.60 | 99.93 | 99.96 | 99.95 | 99.95 |

Comparative Example 1: Test at 50° C. (Distillate Sector Under Vacuum)

The lumen of each capillary membrane was maintained under a 20-mbar vacuum by connecting a water jet pump to a slot on the line downstream of the condenser. An average distillate flow of 5.0 L/m$^2$*h was obtained. Table 3 shows the pH of the distillate and the retentions referring to the chemical-physical characteristics that indicate contamination ("N.D." if not determined). The data reported show that the MD conducted by maintaining the distillate sector at atmospheric pressure is the most effective system for concentrating amine water, allowing greater retentions referring to the chemical-physical characteristics indicating contamination and therefore the production of best quality water.

This cannot be deduced from the teachings found in the state of the art.

TABLE 3

| t [h] | pH [-] | R (EC) [%] | R (COD) [%] | R (N) [%] | R (S) [%] | R (B) [%] |
|---|---|---|---|---|---|---|
| 50 | 8.3 | 95.60 | 96.10 | 96.11 | N.D. | 96.13 |
| 200 | 8.3 | 95.50 | 95.80 | 96.01 | 96.00 | 96.10 |

The invention claimed is:

1. A process for concentrating amine water, the process comprising:
    heating the amine water to a temperature ranging from 30° C. to 95° C.,
    wherein the amine water comprises water and nitrogen-containing chemical compounds and the amine water has a concentration of total nitrogen that ranges from 10,000 mg/L to 100,000 mg/L, a sulfur sulfide concentration that ranges from 1,000 mg/L to 10,000 mg/L, a boron concentration that ranges from 10 mg/L to 1,000 mg/L, and a chemical oxygen demand that ranges from 100,000 mg/L to 1,000,000 mg/L;
    feeding the heated amine water to a first sector of a membrane distillation unit,
    wherein the membrane distillation unit comprises a membrane between a second sector of the membrane distillation unit and the first sector,
    whereby a distillate in vapour phase permeates through the membrane into the second sector, leaving a concentrate in the first sector;
    maintaining the first sector and the second sector at atmospheric pressure;
    flowing a carrier gas through the second sector to saturate the carrier gas with the distillate in vapour phase in a saturated stream; and
    cooling the carrier gas saturated with vapor distillate by heat exchange with a fluid at an initial temperature ranging from 0° C. to 25° C. so that the vapor distillate condenses to yield a distillate in liquid phase and gaseous stream of the carrier gas and any non-condensable,
    wherein the distillate in liquid phase has a chemical oxygen demand, a concentration of total nitrogen, a concentration of boron, and a concentration of sulfur sulfide that are each at least 99% lower than the amine water fed.

2. The process according to claim 1, wherein the heating is to a temperature ranging from 40° C. to 90° C.

3. The process according to claim 1, wherein the nitrogen-containing chemical compounds are amines.

4. The process according to claim 3, wherein the amine is an alkanolamine.

5. The process according to claim 4, wherein the alkanolamine is N-methyldiethanolamine.

6. The process according to claim 1, wherein the concentration of total nitrogen ranges from 20,000 mg/L to 100,000 mg/L.

7. The process according to claim 6, wherein the concentration of total nitrogen ranges from 30,000 mg/L to 100,000 mg/L.

8. The process according to claim 1, wherein the sulfur sulfide concentration ranges from 2,000 mg/L to 10,000 mg/L.

9. The process according to claim 8, wherein the sulfur sulfide concentration ranges from 3,000 mg/L to 10,000 mg/L.

10. The process according to claim 1, wherein the chemical oxygen demand ranges from 200,000 mg/L to 1,000,000 mg/L.

11. The process according to claim 10, wherein the chemical oxygen demand ranges from 300,000 mg/L to 1,000,000 mg/L.

12. The process according to claim 1, wherein the amine water has an electrical conductivity that ranges from 500 µS/cm to 150,000 µS/cm.

13. The process according to claim 12, wherein the electrical conductivity ranges from 5,000 µS/cm to 150,000 µS/cm.

14. The process according to claim 13, wherein the electrical conductivity ranges from 10,000 µS/cm to 150,000 µS/cm.

15. The process according to claim 1, wherein the concentration of boron ranges from 50 mg/L to 1,000 mg/L.

16. The process according to claim 15, wherein the boron concentration ranges from 100 mg/L to 1,000 mg/L.

17. The process according to claim 1, wherein the membrane is selected from the group consisting of inorganic polymers, organic polymers, inorganic copolymers, inorganic copolymers, and combinations thereof.

18. The process according to claim 1, wherein the membrane is selected from the group consisting of: organic polymers containing halogens, organic copolymers containing halogens, organic polymers not containing halogens, organic copolymers not containing halogens, and combinations thereof.

19. The process according to claim 1, wherein the membrane is selected from the group consisting of: organic polymers containing fluorine, organic copolymers containing fluorine, organic polymers not containing fluorine, copolymers not containing fluorine, and combinations thereof.

20. The process according to claim 19, wherein the membrane is a membrane selected from the group consisting of: oxides, sulfides, zeolites, metal-organic materials, carbonaceous materials, polysilanes and their copolymers, polysiloxanes and their copolymers, polysulfones and their copolymers, polyacrylates and their copolymers, proteins, polyamides and their copolymers, polyurethanes and their copolymers, polyketones and their copolymers, polyesters and their copolymers, polysaccharides, polyethers and their copolymers, polyaromatics and their copolymers, polyolefins and their copolymers, and combinations thereof.

21. The process according to claim 20, wherein the membrane is polypropylene.

22. The process according to claim 1, further comprising maintaining the first sector and the second sector at a temperature in the range 30-95° C.

* * * * *